(12) United States Patent
McQueen et al.

(10) Patent No.: US 10,354,621 B1
(45) Date of Patent: Jul. 16, 2019

(54) VARIABLE DENSITY CONTENT DISPLAY

(71) Applicant: Amazon Technologies, Inc., Seattle, WA (US)

(72) Inventors: Michael Douglas McQueen, San Francisco, CA (US); Meng Li, San Francisco, CA (US); Eric Alan Breitbard, Oakland, CA (US); Robert Steven Murdock, Fairfax, CA (US); Julien George Beguin, San Francisco, CA (US); Gregory Michael Hart, Mercer Island, WA (US); Scott Ian Blanksteen, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/910,650

(22) Filed: Mar. 2, 2018

Related U.S. Application Data

(63) Continuation of application No. 14/453,456, filed on Aug. 6, 2014, now Pat. No. 9,911,398.

(51) Int. Cl.
*G06F 3/00* (2006.01)
*G09G 5/373* (2006.01)

(52) U.S. Cl.
CPC ............. *G09G 5/373* (2013.01); *G06F 3/005* (2013.01); *G09G 2340/04* (2013.01); *G09G 2354/00* (2013.01)

(58) Field of Classification Search
CPC ............... G09G 5/373; G09G 2354/00; G09G 2340/04; G06F 3/0482; G06F 3/0481; G06F 3/0304; G06F 1/1686; G06F 1/1605; G06F 3/013; G06F 3/005
See application file for complete search history.

(56) References Cited

U.S. PATENT DOCUMENTS

| | | | |
|---|---|---|---|
| 2009/0315869 A1* | 12/2009 | Sugihara | G06F 1/1605 345/204 |
| 2013/0190086 A1* | 7/2013 | Maison | G06K 9/00369 463/31 |
| 2014/0181910 A1* | 6/2014 | Fingal | H04L 63/105 726/4 |
| 2015/0023562 A1* | 1/2015 | Moshfeghi | G01S 5/0263 382/106 |

\* cited by examiner

*Primary Examiner* — Premal R Patel
(74) *Attorney, Agent, or Firm* — Eversheds Sutherland (US) LLP

(57) ABSTRACT

A video display hub is mounted in a common household area such as a kitchen or family room. The display hub is configured to display various types of information for users in the area, such as weather, traffic updates, schedules, notes, messages, lists, news, etc. When the user is at a distance from the display hub, information is presented at a relatively low density, with a low level of granularity and detail in conjunction with large fonts, graphics, and icons. When the user is close to the display hub, information is presented at a relatively high density, with a high level of granularity and detail in conjunction with small fonts, graphics, and icons.

20 Claims, 11 Drawing Sheets

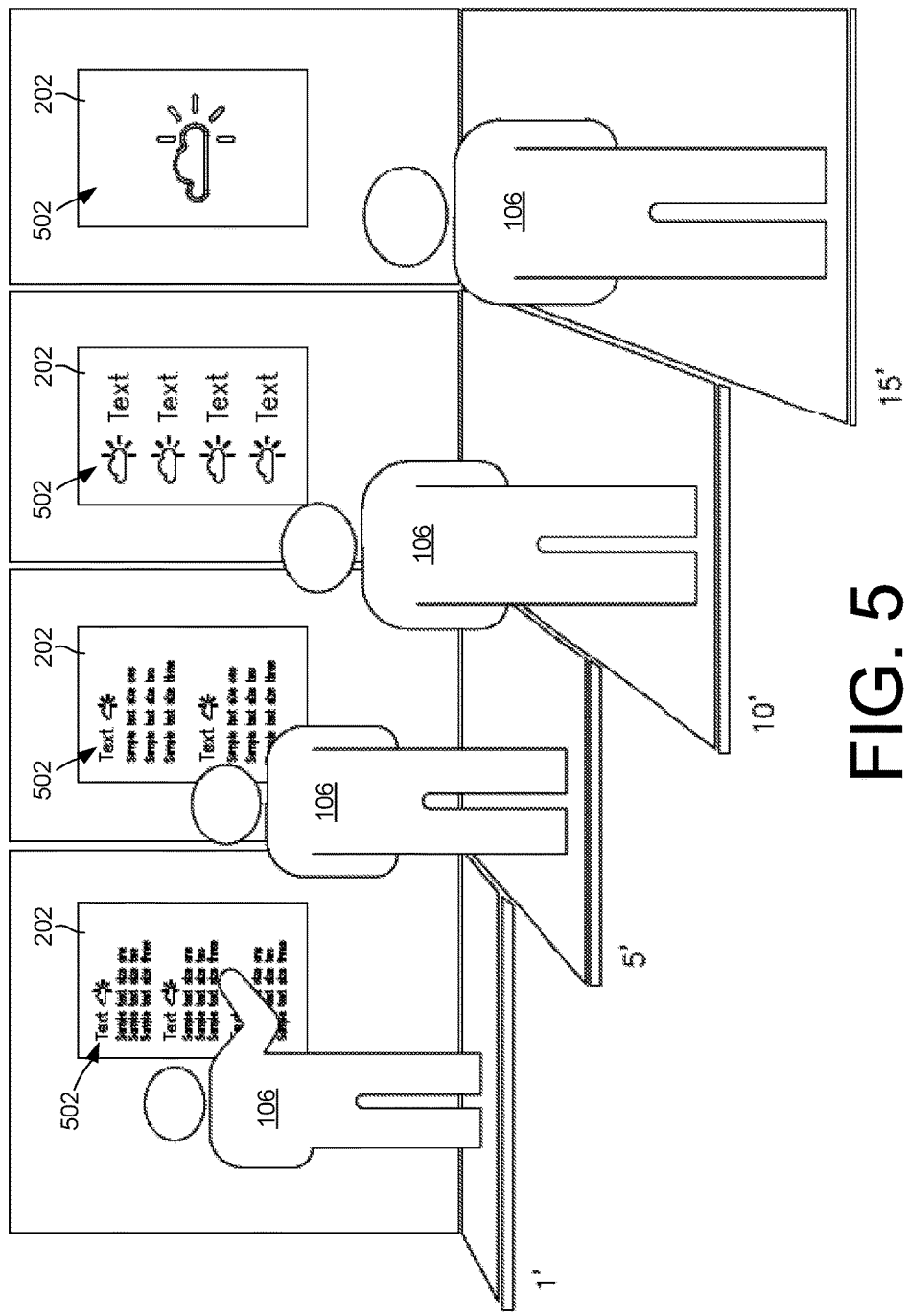

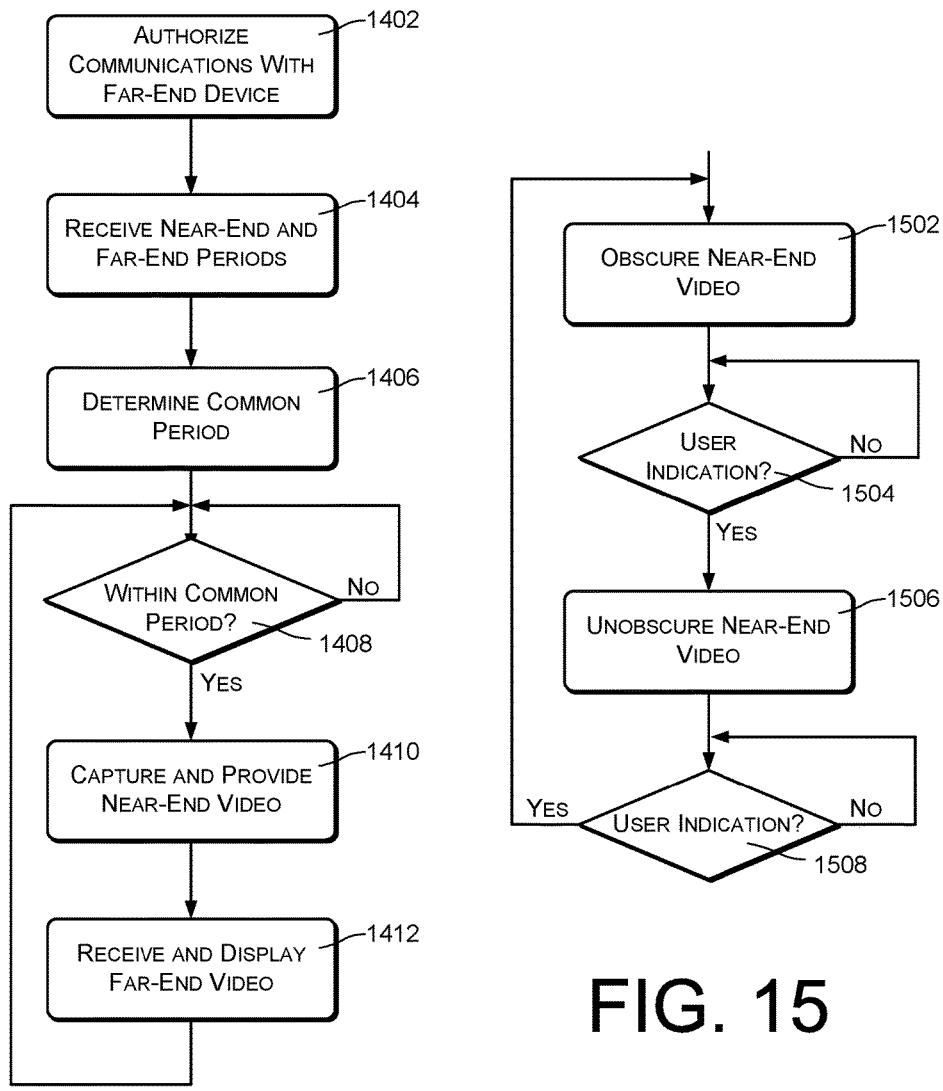

VARIABLE DENSITY CONTENT DISPLAY

CROSS-REFERENCE TO RELATED APPLICATION(S)

This application is a continuation of U.S. application Ser. No. 14/453,456 filed Aug. 6, 2014, the content of which is incorporated herein by reference in its entirety.

BACKGROUND

Despite the prevalence of personal computers, laptop computers, tablet computers, smartphones, and other personal devices, families still struggle to keep track of everyone's schedules, chores to be done, grocery shopping lists, and a wide variety of other home-related tasks. People use complex systems of shared online calendars, paper calendars, whiteboards, post-it notes, and other tools to get by, but this fragmented approach is both confusing and time-consuming.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 5 is a conceptual diagram illustrating the use of different context densities at different user distances.

FIGS. 13-16 are flow diagrams illustrating example methods of automatically staging and performing video conversations.

DETAILED DESCRIPTION

Described herein are systems, devices, and techniques for providing hub services for a household. In certain embodiments, the services may include displaying various types of information for a user at content densities that are appropriate for the distance of the user from the displayed content.

The system includes a display hub that is mounted in a common area of a household such as a kitchen or family room. The display hub is configure to display various type of content for viewing by nearby users, including things such as weather, schedules, lists, news, messages, etc.

The display hub is configured to display content at a content density that varies with the distance of the user from the display hub. When the user is close to the display hub, content is displayed at a relatively high content density. At a high density, content may contain a high level of granularity and detail, and may use relatively small fonts, graphics, and icons.

When the user is far from the display hub, content is displayed at a relatively low content density. At a low density, content may contain a low level of granularity and detail, and may use relatively large fonts, graphics, and icons.

Figure 1:
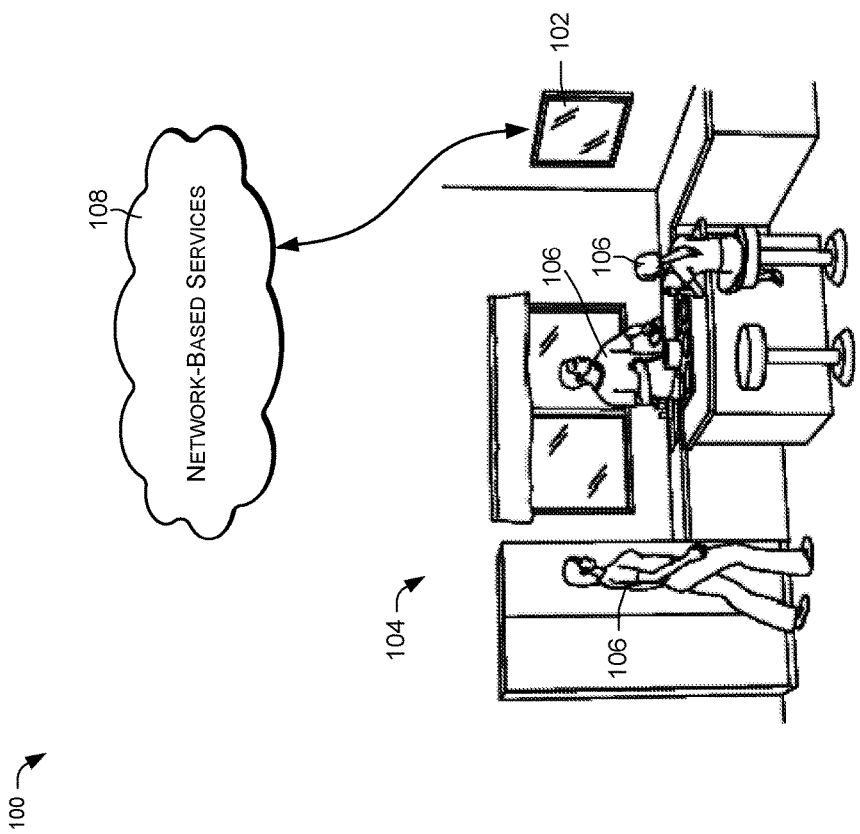
FIG. 1 illustrates an example system and environment that includes a display hub mounted in a central location within a household.

FIG. 1 illustrates aspects of a system 100 that provides centralized communications and other functionality for multiple users within a home. The system comprises a display hub 102 that is located within a home 104. The display hub 102 comprises a display panel or screen mounted or located in a room of the home for convenient, always-on access to multiple members of a household. For example, the display hub 102 may be mounted in a central location or activity center of the home such as a kitchen, living room, or family room. The display hub 102 may be mounted so as to be easily visible to one or more users 106 during normal activities within the room such as eating, talking, studying, preparing food, and so forth, whether standing or sitting. The display hub 102 may be configured to display color graphics and to play audio. The display hub 102 may also have input capabilities. For example, the display hub 102 may be capable of capturing audio, video, and other data from its environment.

The system 100 may include or operate in conjunction with one or more remotely located online or network-based services 108, which may provide services to multiple display hubs 102 located in homes of different users or families. The display hub 102 and the network-based services 108 may communicate with each other over a wide-area network such as the Internet.

Figure 2:
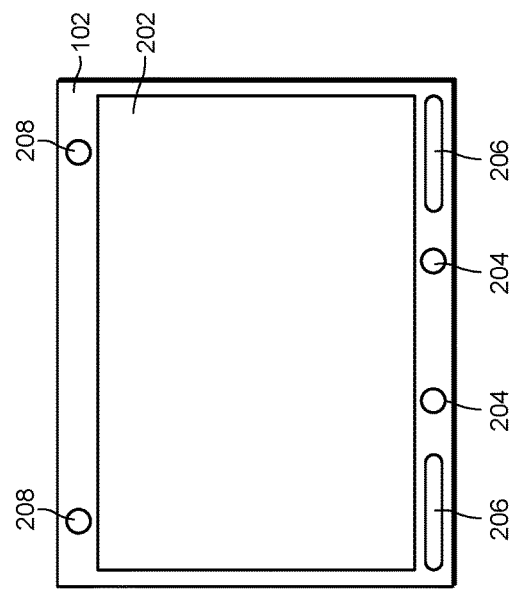
FIG. 2 is a front view of an example display hub such as may be used in the environment of FIG. 1.

FIG. 2 shows an example configuration of the display hub 102. The display hub 102 may have a color, flat-panel display 202 such as an LED (light-emitting diode) display or similar display capable of displaying graphical images, including pictures, still images, animations, video, user interfaces, and other graphics. The display 202 may be touch-sensitive so that a user can select controls and interact with the system 100 by touching the display 202 with a finger or stylus.

The display hub 102 may have one or more microphones 204 and one or more speakers 206. The display hub 102 may also have one or more cameras 208. The cameras may have a relatively wide field-of-view (FOV) such as 140 to 160 degrees. In some embodiments, a camera may be positioned at each of the four corners of the display hub 102 to obtain video from different viewpoints. Alternatively, different cameras may have different characteristics such as different FOVs, different wavelength sensitivities (optical, infrared, etc.) and so forth.

Audio from the microphones 204 and video from the cameras 208 may be captured and provided to the network-based services 108 for analysis. The network-based services 108 may provide audio and video to the display hub 102 to be played on the speakers 206 and the display 202.

Referring again to FIG. 1, the display hub 102 and the network-based services 108 may be configured to act in support of each other to respond to user actions and other local conditions within the home 104 as well as to proactively provide information and perform actions that may be convenient to the members of the household.

The network-based services 108 receive various types of data from the display hub 102 and provide actions and services to or on behalf of the users using the physical and logical components of the display hub 102. Data received from the display hub 102 may include audio captured by microphones 204 of the display hub 102, pictures or video captured by cameras 208 of the display hub 102, and other sensor data representing or describing events and conditions nearby the display hub 102. Generally, data provided to the display hub 102 from the network-based services 108 may include control logic, commands, data objects, text, speech, graphics for rendering on the display 202, audio for rendering on the speakers 206, and so forth.

In some embodiments, the network-based services 108 may control many aspects of the operation of the display hub 102. For example, the network-based services 108 may be configured to create and control graphics-based and/or speech-based user interfaces that are presented at the display hub 102. When presenting a graphics-based user interface, the network-based services 108 may generate content to be displayed by the display 202, including graphical controls or control elements that can be selected or activated by touch. The network-based services 108 may receive notifications regarding user inputs, such as notifications when a user touches a particular control, and may respond by performing actions, providing services, or further interacting with the user by presenting different or additional content on the display 202 of the display hub 102.

When implementing a voice-based or speech-based user interface, the display hub 102 may capture local audio using the microphones 204, including voices of users, and provide the audio to the network-based services 108. The network-based services 108 may be configured to receive the audio and to interpret and act upon spoken user commands contained in the audio. More specifically, the network-based services 108 may perform automatic speech recognition on audio received from the display hub 102 and may also perform natural language understanding to determine intents expressed by users. The network-based services 108 may in some cases be configured to perform two-way voice interactions with local users 106 by receiving and interpreting user speech and by providing responsive speech to the display hub 102 for playback on the speakers 206 of the display hub 102.

The network-based services 108 may include communication services, music or other content services, shopping or commerce services, web sites, databases, applications, etc., all of which may be accessible by the display hub 102 through the Internet or other wide-area network. The display hub 102 and/or its supporting online services may be configured to access any of these services in order to implement the functionality described herein. For example, the display hub may obtain music or other media content from an online music service and may play the music on the speakers 206 of the display hub 102. As another example the display hub 102 may implement calendaring functionality in conjunction with a web-based calendaring service. As yet another example, shopping functionality may be implemented in conjunction with an online commerce site or service. As yet another example, the display hub may have cooking or food recipe functionality that is supported by corresponding network-based services.

The architecture shown in FIG. 1, comprising a local device and one or more remote support services, is only one example of many different possible architectures and configurations. Generally, the functionality described herein may be distributed in different ways among different devices and entities, including the local display hub 102, the remote network-based services 108, and other computing entities, devices, or services.

Figure 3:
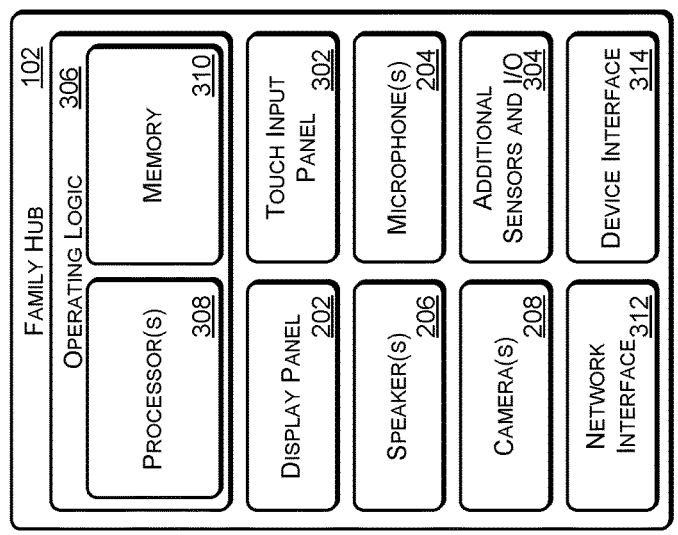
FIG. 3 is a block diagram showing example components of the display hub of FIG. 2.

FIG. 3 shows relevant components of the display hub 102 in an example implementation. The display hub 102 may comprise the color display panel 202 such as an LED (light-emitting diode) display. The display or display panel 202 may have an integrated touch input panel 302, allowing the display hub 102 to respond to user touch. The color display panel 202 and the touch input panel 302 may be used in conjunction with each other to implement a touch-based graphical user interface, wherein the user may provide input and responses by touching controls that are graphically displayed on the display panel 202. The display panel 202 may have a size sufficient to display text that can be read from across a room. For example, the display panel 202 may have a diagonal measurement of 28 inches or greater in certain applications.

The display hub 102 may also have one or more microphones or microphone arrays 204 and one or more speakers 206 as described above. The speakers 206 may be used for playing audio such as music. The speakers 206 may also play audio in conjunction with video that is displayed on the display panel 202. The speakers 206 may also be used to play system-generated speech. The microphones 204 may be used to capture audio from the environment of the display hub 102 including user speech. In some cases, audio beamforming may be used with the microphones 204 to receive sound from selected directions. Audio signals generated by the microphones may also be used for sound source localization, in order to determine positions from which certain sounds such as user voices originate. The system 100 may implement speaker or user recognition based on microphone audio signals in order to identify users who are currently speaking.

The speakers 206 and microphones 204 may be used in conjunction with each other to allow users to communicate telephonically with remote users through the display hub 102. For example, the display hub 102 may be used as a speakerphone or hands-free communication device, with the speakers 206 being used to reproduce far-end audio and the microphones 204 being used to capture near-end audio. The speakers 206 and microphones 204 may also be used as part of a speech-based user interface, in which a user may speak commands and the display hub 102 or associated system may respond with speech.

In certain implementations, the display hub 102 may also have one or more cameras 208 for capturing images and/or video from the nearby environment. The display panel 202, the speakers 206, the microphones 204, and the cameras 208 may be used with each other to implement videophone or hands-free video communication functionality, allowing local users to communicate verbally and visually with remote users and households through both sound and video. The display panel 202 and cameras 208 may be used to display far-end video and to capture near-end video, respectively, while the speakers 206 and the microphones 204 may be used to reproduce far-end audio and to capture near-end audio, respectively.

Images captured and provided by the cameras 208 may also be analyzed to detect environmental conditions such as positions of users or other objects, movements or gestures of users, face expressions, etc.

The display hub 102 may have various additional input and output components or capabilities 304, which may include keyboards, virtual keyboards, infrared cameras or sensors, proximity sensors, depth cameras, projectors, annunciators, indicators, and so forth, which may allow various additional functionalities and methods of user interaction.

The display hub 102 may have operating logic 306 that implements various functionality as will be described herein. The operating logic 306 may be implemented by one or more processors 308 configured to execute software from associated memory 310. Software may comprise programs, program modules, routines, functions, objects, data structures, etc., which are executable by the processors 308. The one or more processors 308 may comprise processor cores. The one or more processors 308 may also comprise or include digital signal processors.

The memory 310 may include computer-readable storage media ("CRSM"), which may be any available physical media accessible by the one or more processors 308 to execute instructions stored on the memory. In one basic implementation, CRSM may include random access memory ("RAM") and flash memory. In other implementations, CRSM may include, but is not limited to, read-only memory ("ROM"), electrically erasable programmable read-only memory ("EEPROM"), or any other medium which can be used to store the desired information and which can be accessed by the processor, including rotating media, magnetic media, optical media, and so forth. The CRSM may also include storage media such as CDs (compact disks) DVDs (digital versatile disks), and flash drives that are used to store, transfer, and distribute software.

The display hub 102 may have a network interface 312 for connection to a local-area network and/or wide-area network. For example, the network interface 312 may allow the display hub 102 to communicate through a public network such as the Internet with the network-based services 108, which may be used to supplement and/or support the operation and functionality of the display hub 102. The network interface 312 may comprise a wireless network interface such as a WiFi® interface, which may be configured to connect though a local wireless access point in order to connect to the Internet. In some cases the network interface 312 may comprise a cellular data interface.

The display hub 102 may also have a local, wireless, device-to-device interface 314 such as a Bluetooth® interface. The device-to-device interface 314 may allow the display hub to utilize and interact with local user devices such as smartphones, media devices, headsets, remote speakers, remote microphones, and so forth.

Figure 4:
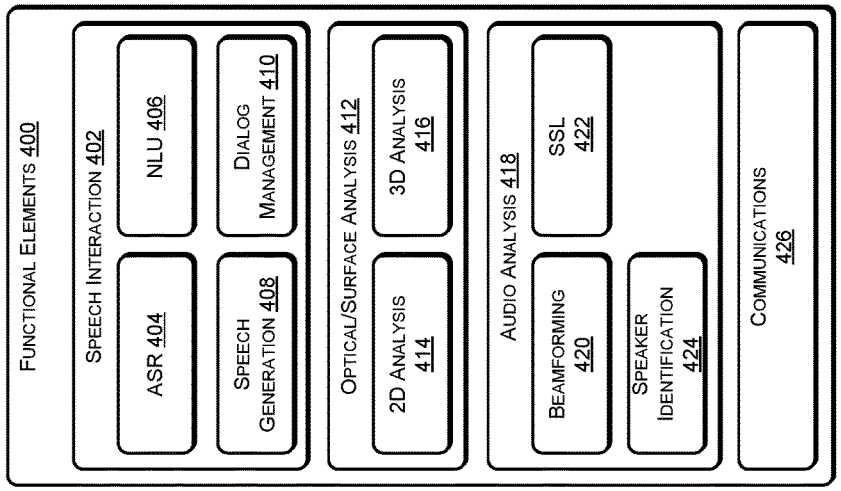
FIG. 4 is a block diagram showing example functional elements that may be provided by the system of FIG. 1.

FIG. 4 shows example logical and/or functional elements 400 of the system 100, which may be implemented or performed by the display hub 102, the network-based services 108, or by a combination of the display hub 102 and the network-based services 108.

The system 100 may include speech interaction components 402, which may include automatic speech recognition (ASR) 404 and natural language understanding (NLU) 406. The speech interaction components 402 may also include speech generation 408 for synthesizing or otherwise providing speech for rendering to a user 106 at the hub 102. The speech interaction components 402 may include dialog management 410 for coordinating two-way speech dialogs with users, in which the system 100 prompts a user by speech to obtain additional spoken information from the user.

The system 100 may include optical and/or surface analysis components 412 that are responsive to data received from various sensors of the display hub 102 to determine information regarding users, objects, and/or surfaces within the room 104. For example, the optical analysis components 412 may have two-dimensional (2D) analysis capabilities 414 for receiving and analyzing 2D images of a scene within the home 104. The 2D analysis capabilities 414 may analyze the images to detect the presence, identities, distances, and/or positions of users, to determine positions, distances, and/or movements of user body parts such as hands and faces, to detect gestures or other movements, to detect face expressions, to determine positions and/or distances of non-human objects such as furniture, etc. The optical analysis components 412 may also be configured to identify products and other articles by optical inspection and/or shape analysis and by comparing images to reference databases containing indexed or tagged images.

The system 100 may further include three-dimensional analysis functionality 416 that is responsive to data received from sensors of the display hub 102 to determine positional or shape-related information regarding the room 104, users and other objects within the room 104, and/or surfaces within the room 104. For example, the 3D analysis functionality 416 may receive depth information, such as a depth-map or three-dimensional image of the room or a scene within the room. Alternatively, the 3D analysis functionality 416 may receive stereoscopic images from which 3D or depth data may be derived. The optical/surface analysis functionality 412 may analyze the 3D or depth data to identify objects and to determine their shapes, distances, and positions, as well as to identify objects based on their shapes. The optical/surface analysis functionality 412 may also be used to detect and analyze movements or gestures of users.

The 2D and 3D analyses capabilities 414 and 416 may be used in conjunction with each other to provide enhanced information regarding objects, object positions, object movements, object shapes, object relationships, object textures, and so forth. The capabilities may also be used in combination for other scene analyses such as user identification, detecting user positions and distances, face detection, face expression detection, eye/gaze tracking, gesture detection, and so forth.

Generally, the optical/surface analysis component 412 may be configured to perform any combination of one or more of the following:

face detection and face-based user identification;
object recognition;
product recognition;
bar code detection and decoding;
skeletal extraction and tracking;
gaze detection;
user attention tracking;
body and body part detection;
proximity detection;
background subtraction;
document capture and normalization;
text recognition;
scene analysis;
face expression detection;
smile detection;
biometric analysis such as pulse detection;
motion detection;

distance determination and tracking;
mood and emotion detection and tracking;
etc.

The functional elements 400 may also include audio analysis capabilities 418. For example, audio analysis capabilities may include one or more audio beamforming elements 420 and sound source localization (SSL) functionality 422. Audio beamforming may be used in conjunction with a microphone array of the display hub 102 to focus reception of sounds in different directions. SSL may be used to detect the positions from which sounds originate, which may be used to determine the locations of users as they speak.

The audio analysis capabilities 418 may also include speaker identification capabilities 424, which may be used to identify users based on their voices.

The optical/surface analysis functionality 412 and the audio analysis functionality 418 can be configured to work together to detect and evaluate various characteristics of a scene and user within a scene.

The functional elements 400 may also include communication functionality 426 for communicating amongst services, with other display hubs, other in-home and/or mobile devices, etc.

The display hub 102 may be configured to provide various functions and capabilities for multiple users within a home. The hub 102 may be configured to recognize or identify individual users through face recognition and/or audio speaker recognition and to automatically display content that is relevant to a recognized user. The hub 102 may also be configured to determine when the attention of the user is directed toward the hub 102, such as by determining when the user is gazing at the hub 102. The hub 102 may select content for display based on user characteristics, such as which users are present, distances of users from the hub 102, whether any user is looking at or approaching the hub 102, whether any user is speaking to the hub 102, and so forth. Presented content may also vary depending on time of day, day of week, whether it is currently a holiday or vacation, whether a calendar event is scheduled at the current time, etc. When multiple users are identified or recognized, information that is relevant to all or each of the users may be compiled on presented.

General types of visual content presented by the display hub may include, without limitation:
news;
traffic information;
weather information;
calendar information;
lists;
email;
notes;
notifications;
schedules;
summaries;
tasks;
communications
graphical information;
pictures;
video;
home automation information;
family tracking information;
product information;
delivery tracking information;
purchase information;
dinner reservations;
recipes;
instructions;
planning information;
etc.

In some cases, background or passive content such as news, traffic information, weather, etc. may be displayed. Such passive content may in some cases be personalized for a user who is present and/or who is directing his or her attention toward the hub 102.

In some embodiments, calendar items from calendars of different family members may be combined and displayed to multiple users or to the family in general. In particular, calendar items or information from calendar items may be examined to identify appointments and other information that may be useful for general family viewing. As an example, parents' first and/or last appointments might be displayed. For work-related appointments, times and locations might be displayed while omitting topics. Alternatively, work-related appointments might be omitted altogether. Whether an appointment as is work-related or personal may in some cases be determined based on the calendars from which they are obtained or based on their specified locations.

In some cases, calendar items that are common to more than one user may also be included in a composite calendar, such as calendar items specifying multiple family members and/or calendar items that are present on the individual calendars of multiple family members. In some cases, upcoming children's appointment may be included on family calendars in order to alert parents to the need for providing transportation or other accommodations. In some cases, appointment titles, topics, or notes may be analyzed to detect whether appointments should be included in a composite calendar display.

Foreground or active information and/or control elements may be presented on the hub 102 when the user is actively giving the hub his or her attention, such as when the user is approaching, looking at, or speaking to the hub 102. For example, a recognized user's calendar, to-do list, email, notes, notifications, personalized news feed, or other information that is particularly relevant to or desired by the user may be displayed. As another example, the hub 102 may play audio and/or video content relevant to the user, such as voice messages, video messages, news clips, music, television shows or movies, and so forth.

The hub 102 may in some embodiments be configured to detect a primary user from among multiple users who are present, and may display information that is customized for the primary user. The primary user may be selected as a user who is directing their attention toward the hub 102, as a user who is gazing at the hub 102, as the user who is nearest to the hub 102, as the most central of the users, or as the user who is farthest from the hub 102.

In some embodiments, the hub 102 may detect when multiple users are present and may omit the display of private information such as emails or personal calendar items when multiple users are present. In other cases, the hub 102 may display composite or compiled information that is relevant to multiple users who are present.

Users may interact with the hub 102 through voice, touch, and/or gestures to request any particular content, function, or activity. For example, a user may interact with the hub 102 by saying "Show me my calendar," "Create a new calendar event," "When is my next appointment?" and so forth. The user may speak similar commands relating to various other activity domains relating to things such as lists, communications, shopping, information sources, meal planning, cooking, food recipes, online ordering, geographic location reporting, and so forth. In some cases, the hub 102 may conduct a bidirectional speech dialog with the user to determine the intent expressed by speech of the user.

The hub 102 may also be configured to recognize hand gestures as commands. For example, a user may wave their hand downward to scroll a displayed screen downward.

Users may also interact with the hub 102 by touching or dragging graphical control elements that are displayed by the hub 102. In some cases, control elements may be displayed in response to a spoken user request. For example, a user may say "Purchase noodles," and the hub 102 may respond by displaying a list of different noodle types for selection by the user. The user may then select from among the different choices by touching the desired option on the screen of the hub 102.

The hub 102 may be configured to detect the proximity of a user and to change the displayed content in response to changing proximity. For example, the hub 102 may initially display passive information like weather, news and notifications. As a user walks toward the hub 102, the hub may switch to more active information about the family's day such as a family dashboard showing notes, lists, notifications, and schedules relating to family activities. Furthermore, content may be presented in different sizes or at different levels of detail depending on user distance. As an example, a user's next appointment may be shown in a large font when the user is far from the hub 102. When the user is close, the hub 102 may alternatively display the schedule for the entire day, week, or month using smaller fonts and graphical elements.

Similarly, the hub 102 may be configured to detect when a user is directing their attention toward the hub 102, and may display user-specific or more detailed information when the user's gaze or attention is toward the hub 102. When the user removes their attention, more general or passive information may again be displayed.

Presented information may vary depending on the user or users who are present, the time of day, and other factors. For example, the hub 102 may identify which of multiple users are present and may in response display a summary of calendar and/or traffic information relevant to the user's commute. The user may see personal notifications such as scheduled deliveries, email notifications, etc. In other cases, the hub 102 may identify multiple users and may display information that is relevant to all of the users who are currently present.

Upon installation or setup, the hub 102 may be configured to access the personal calendars of the household members. Upon request by a user, which may be made either through voice or touch, the hub 102 may display a composite family calendar showing the appointments of all family members for the day as well as any scheduled events that are currently underway. Alternatively, the hub 102 may recognize or identify a current user and may display that user's schedule. Users may give additional commands to see calendar information organized in different ways, for different users, and for different time periods. Information may also be delivered by the hub 102 through speech rather than graphically.

A user may create an appointment by using voice or touch. Upon specifying appointment details, the user may also identify those members of the family who are affected by the appointment, and the appointment may be added to the personal calendars of those users, who may receive notifications on their handheld devices.

The hub 102 may be used to create lists, including to-do lists, task lists, and shopping lists. A shopping list, for example, may be shared between all family members on the hub 102. Each family member may interact with the hub 102 to add items to the list. An item may be added by voice command, such as "Add soup to the shopping list." In response to a command such as this, the hub 102 may respond by inquiring or requesting additional information such as brand, quantity, etc. The additional information may be requested through a voice dialog or by presenting options on the screen of the hub 102 that can be selected by the user.

A user may also instruct the hub 102 to purchase items that are on the shopping list. In response, the hub may communicate with an online merchant to place an order for the items on the shopping list.

The hub 102 may also be capable of visually recognizing items for purchase or for addition to shopping lists. For example, upon using the last can of tomato soup, a user may hold the empty can in front of the hub 102 and instruct the hub 102 by voice to add the item to the shopping list. In response, the hub 102 captures an image of the can, recognizes the product, and adds the product to the family shopping list. Alternatively, the user may instruct the hub 102 to purchase the item, which the hub 102 may accomplish by placing an order with an online merchant.

Shopping lists created or displayed on the hub 102 may be synchronized with mobile devices of household members, who may use the lists when shopping. As each item is obtained, the user may check it off the list. Changes such as this are coordinated and synchronized between the mobile devices and with the hub 102.

Lists created on the hub 102 may include to-do lists, task lists, notes, etc., any of which may be synchronized or shared with family members. Tasks or task items may also be assigned to particular family members. Users may also create notes for each list or list item.

The hub 102 may also be used for creating notes, which may be for the personal use of a single user or may be intended as shared communications between family members. A note may be created by a voice command, by touch interface with a virtual keyboard, or by drawing on the face of the hub 102 using a finger or stylus. Notes may be designated as "shared," so that they will be displayed to any users within the vicinity of the hub 102.

For example, a child may write a note on the hub 102 such as "I walked and fed the dog, but we are out of dog food." The child may draw a graphic such as a smiley face along with the note. As she is writing the note, the hub 102 recognizes the child and records the fact that the note was created by this particular household member. The note may then be displayed to other family members who enter the room. In addition, voice notes or video recordings may be added to notes. Furthermore, the author of a note may indicate that the note is intended for a particular recipient. The system may subsequently recognize the presence of that recipient near the hub 102 and may display the note when that recipient is present. In some cases, the system may notify the recipient of the note by playing a unique sound when the recipient passes near the hub 102.

The hub 102 may be used to obtain information and/or to perform various types of online activities and actions. For example, a user may ask "When does daylight savings time start" and the hub 102 may reply with the appropriate date.

The following are some examples of activities that may be requested by users and performed by the hub 102 in cooperation with the network-based services 108:

Media control, such as playing music, video, or other content;
Home automation;
Personal and family calendaring;
Family tracking;

Product recognition and ordering;
Delivery tracking;
Showing pictures;
Performing Internet searches;
Ordering tickets;
Making dinner reservations and other reservations;
Ordering food for delivery;
Calling a taxi;
Displaying user manuals;
Finding, organizing, and displaying cooking recipes;
Tracking geographic locations of family members;
Ordering and re-ordering groceries and other products;
Meal planning;
Viewing calendars and creating appointments;
Creating and sharing notes;
Displaying traffic, news, weather, and similar information;
Communicating via voice and/or video;
Generating and receiving notifications;
Creating, sending, receiving, and reading email; and
Creating and sharing lists such as shopping lists, to-do lists, and task lists.

The activities, actions, and functions that may be performed by the system 100 and/or the hub 102 are not limited to those specifically enumerated above.

FIG. 5 illustrates an example technique for presenting content to a user to accommodate the distance of a user 106 from a display surface 404. The illustrated technique may be used by the display hub 102 to scale or size visual content on its display panel 202.

Generally, the technique involves displaying visual content on the display 202 at a content density that changes according to the distance of the user 106 from the display 202. When the user 106 is relatively close to the display 202, a relatively high content density is selected and visual content is displayed at the selected high content density. When the user 106 is relatively far from the display 202, a relatively low content density is selected and the visual content is displayed at the selected low content density.

A high content density may include relatively more content, such as a larger number of topical sections, a larger number of items within each section, a relatively higher level of granularity, a relatively higher level of detail, etc. The high content density may also use smaller fonts, icons, and graphics to allow the increased information density. However, this may cause the content to be difficult to see from a distance.

A low content density may include relatively less content, such as a smaller number of topical sections, a smaller number of items within each section, relatively less information granularity and detail, etc. The low content density may also use have larger fonts, icons, and graphics, so that the presented information can be easily seen from a distance.

FIG. 5 shows the user 106 at a series of increasing distances from the display 202. At each of distances D1, D2, D3, and D4, visual content 502 is displayed at a different content density.

When the user is within a first distance D1, which may be in the range of 1 foot, as an example, a relatively high content density is selected and used for displaying visual content 502. The displayed content 502 at this density includes several topic headings, sections, areas, or panes. Each topic section has information at a high level of detail or granularity, which may include a relatively large number of items. In addition, the displayed content 502 may include touch-responsive controls that the user 106 may select by touching the display 202. At the distance D1, the user 106 is close enough to touch the display 202. The hub 102 may forego displaying touch-responsive controls at distances greater than the first distance D1 because the user 106 is not close enough to reach the display 202.

When the user 106 is at distance between the first distance D1 and a second distance D2, where D2 may be in the range of 5 feet as an example, a somewhat lower content density is selected and used for displaying the content 502. At this content density, the content 502 has fewer topic sections and may also have larger font sizes and icons so that they can be seen from the larger distances.

When the user 106 is at a distance between the second distance D2 and a third distance D3, where D3 may be in the range of 10 feet as an example, a yet lower content density is selected and used for displaying the content 502. At this content density, the content is presented in a summary form, with relatively large icons and a limited amount of vary large text.

When the user 106 is at a distance greater than the third distance D3, such as at a fourth distance D4 which may be in the range of 15 feet as an example, a very low content density is selected and used for displaying the content 502. At this content density, a limited number of very large and descriptive icons or graphics are displayed.

Generally, increased content density may correspond to any one or more of decreased font size, decreased icon size, decreased graphic sizes, increased number of topic sections, increased information granularity, increased information detail, increased text length of list or information items, increased number of list or information items, etc. Higher content densities are suitable for viewing at relatively short distances from the display 202.

Decreased content density may correspond to any one or more of increased font size, increased icon size, increased graphic sizes, decreased number of topic sections, decreased information granularity, decreased information detail, decreased text length of list or information items, decreased number of list or information items, etc. Lower content densities are suitable for viewing at relatively larger distances from the display 202. Touch-sensitive controls may be omitted from low density presentations.

Figure 6:
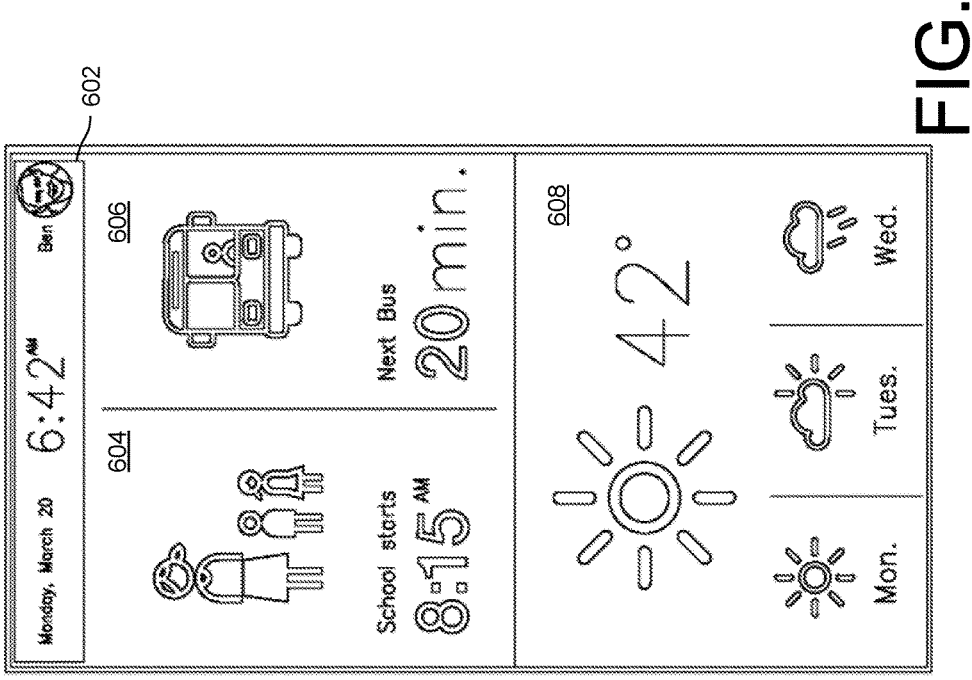

FIG. 6 shows an example of content 602 that is displayed at a relatively low content density. This example has a first topic section 604 that shows the next scheduled event or appointment. A second topic section 606 shows related traffic or transit information. A third topic section 608 shows current weather conditions and a brief forecast. Each section contains a limited number of items and presents only highly summarized information, at a very low level of detail and granularity. Large font sizes, graphics, and icons are used to convey information.

Figure 7:
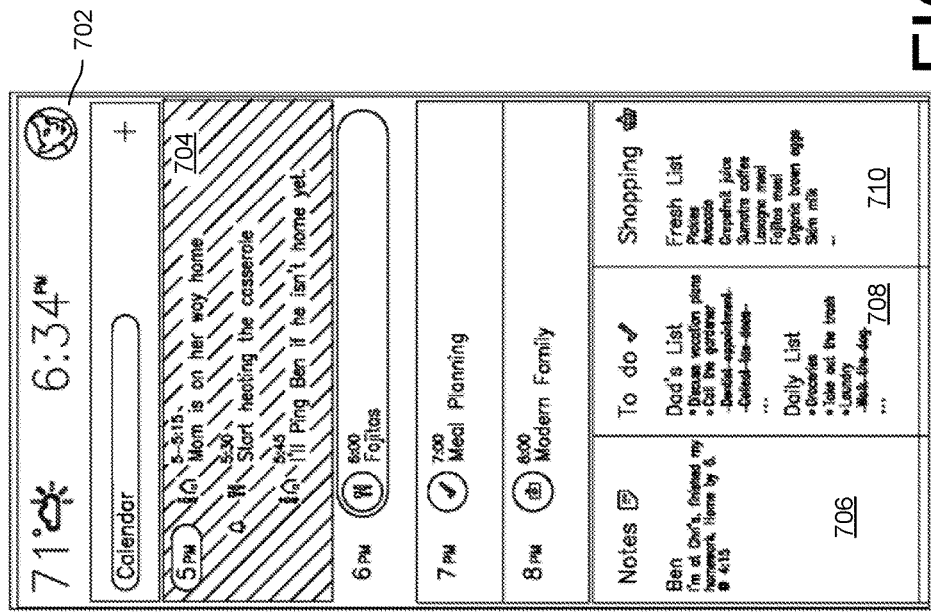
FIGS. 6-8 are examples of displayed content at different content densities.

FIG. 7 shows an example of content 702 that is displayed at an intermediate content density. This example has a calendar topic section 704 that shows the current day's appointments or events. The content 702 also includes a notes section 706 that shows the content of notes, a to-do section 708 that enumerates lists and list items, and a shopping section 708 that enumerates items of a shopping list. This example shows information at a higher level of granularity and detail. Smaller and more text is used to provide item details. The intermediate content density may include more topic sections and more informational items within each section.

Figure 8:
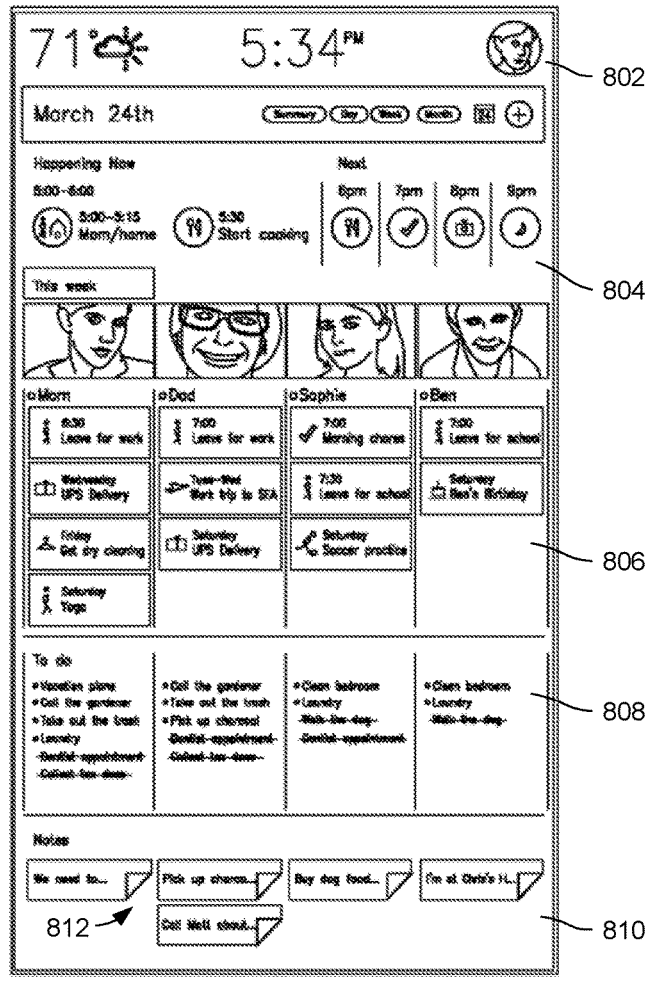

FIG. 8 shows an example of content 802 that is displayed at a relatively high content density. This example uses relatively small font sizes to display information at a high level of detail and granularity. The content 802 includes a current event topic section 804, a week summary 806, a to-do section 808, and a notes section 810. The content 802 may also include touch-responsive controls, such as the controls 812 shown in the notes section 810, which may be selected by the user to navigate to additional content.

Figure 9:
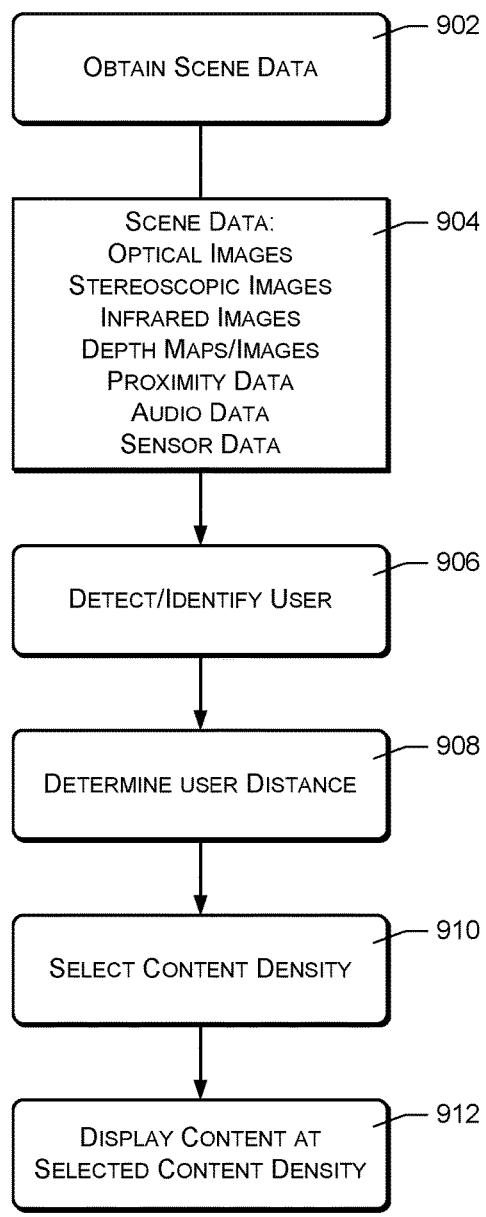
FIG. 9 is a flow diagram illustrating an example method of displaying content at different content densities in accordance with distance of a user from a display hub.

FIG. 9 shows an example method 900 of displaying content based on the distance of a user from a display surface. An action 902 comprises obtaining scene data 904 regarding a scene within a room or other environment. The scene may include a user or multiple users. The data 904 may comprise images obtained from cameras or other sensors of the hub 102. For example, the scene data 904 may comprise two-dimensional optical images, pictures, or video of the scene produced by and obtained from a color camera of the hub 102. As another example, the scene data 904 may comprise three-dimensional images or depth maps of the scene produced by a depth camera or depth sensor of the hub 102. The scene data 904 may also comprise stereoscopic images, infrared images, proximity data, audio signals or data, and other sensor data.

An action 906 may comprise detecting the presence of and/or identifying a user within the scene. This may be accomplished by analyzing the scene data. For example, two-dimensional optical images may be analyzed using shape detection, face detection, body part detection, and so forth to detect the presence of a human within the room or scene. Identification of the user may be performed using face recognition, voice/speaker recognition, or other techniques. Depth maps may also be used in conjunction with two-dimensional images to detect and/or identify users within the scene.

In certain embodiments, characteristics of personal devices carried by a user may be analyzed to determine the presence or identities of people. For example, an active Bluetooth® or other wireless connection may be analyzed to identify a particular device, which may in turn be associated with a particular person. The active Bluetooth® connection may be used to identify a person and as an indication that the person is in the room. Similarly, devices may in some cases be queried through a WiFi® connection to obtain identifying information, which may be associated with a particular user. In some cases, a device may be queried to determine its geographical coordinates based on its internal geolocation capabilities. This information may be used as the basis for determining whether the device is in the proximity of the hub 102.

An action 908 may comprise determining the distance of the detected user from the display surface. This action may be performed based on depth maps captured by and obtained from a depth sensor or camera or through stereoscopic analysis of two-dimensional images captured by cameras having different lateral displacements. Specifically, surfaces corresponding to areas of the scene identified as being occupied by a user may be analyzed to determine their distances from the display surface. In some cases, various types of proximity sensors may alternatively be used to determine distances of users from the display surface. Audio analysis, such as sound source localization (SSL), may also be used to determine the distance of the user based on audio signals provided by a microphone array. Depth maps may be created using various components and techniques, including structured light projection and analysis, stereoscopic image analysis, optical time-of-flight analysis, acoustic analysis, and so forth. Illumination of a scene for purposes of capturing images may be accomplished using ambient light and/or infrared/non-visible light.

In some cases, certain types of 2D optical analyses may be used to determine distances of users. For example, skeletal extraction/tracking may be used to detect a human body or body part and the size of the body or body part may be used as an indication of distance. More specifically, a captured 2D image may be analyzed to detect the face of a user, and the size of the face within the image may be determined and used as an indication of the distance of the face from the hub 102. The closer the face is to the hub 102, the larger it will appear in the 2D image.

An action 910 may comprise selecting a content density. The content density may be selected based on the determined distance of the user from the display surface. For example, content may be displayed at a first, relatively high content density when the user is at a first distance from the display surface and at a second, relatively low content density when the user is at a second, greater distance from the display surface. Generally, the content density is selected so that it increases as the user moves toward the display surface and decreases as the user moves away from the display surface.

The action 910 may in some cases comprise comparing the distance of the user from the display surface to one or more thresholds. A high content density may be selected when the user within a threshold distance and a low content density may be selected when the user is outside of the threshold distance. Multiple thresholds may be used and may correspond to different content densities, with larger thresholds corresponding to lower content densities.

Content displayed at higher densities may include touch-responsive visual controls. In particular, content displayed when a user is within reaching distance of the display surface may include touch-responsive controls, while content displayed when the user is outside of reaching distance of the display surface may exclude touch-responsive controls.

Selecting the content density may also be based upon the particular user who has been detected in the action 906, upon preferences of the user, and/or upon a known visual acuity of the user. For example, certain users having relatively lower visual acuity may desire relatively lower content densities at each of the multiple threshold distances. Users may specify their preferences regarding desired content densities during configuration of the hub 102.

Selecting the content density may in some embodiments be based on whether a detected user is directing their attention toward the hub 102. For example, content may be displayed at a relatively low density when the user is not looking at the hub 102 and at a higher density when the user is looking at the hub 102. When the user is looking at the hub 102, the content density may be selected as described above based on the distance of the user from the hub 102.

An action 912 comprises displaying the content at the selected content density on the display panel of the hub 102.

In some cases, multiple users may be detected in the action 906, and a primary user may be selected from among the multiple users. The primary user may be identified as a user who is directing their attention toward the hub 102 or gazing at the hub 102, who is nearest the hub 102, who is speaking, who is actively interacting with the hub 102, or based on any combination of various factors. The action 910 of selecting the content density may then be based upon the distance of the primary user from the display surface.

The actions of FIG. 9 may be repeated continuously or periodically to change the content density over time as the user moves to different distances from the hub 102. However, the action 910 may be implemented so as to limit the frequency of changes or oscillations between different content densities. As an example, a change in content density may be followed by a time period in which further changes are not allowed. Similarly, after changing from a first content density to a second content density, changes back to the first content density may be disallowed within a certain time period.

Although the method of FIG. 9 is described in the environment of a family hub or display hub, the described techniques may also be used in other devices such as personal computers, media devices, smartphones, tablet computers, mobile devices, and so forth.

Figure 10:
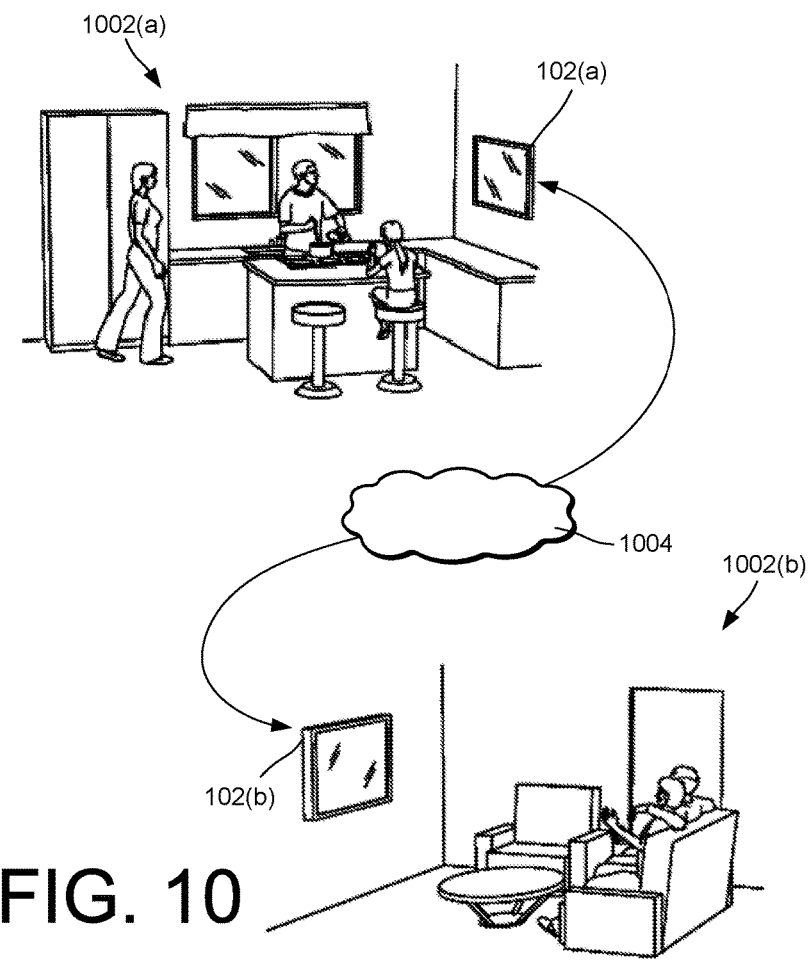
FIG. 10 illustrates an example configuration of display hubs that may be used to facilitate automatically staged video conversations.

FIG. 10 illustrates an example usage of two display hubs 102(a) and 102(b) for providing automatically staged video communications between two homes 1002(a) and 1002(b). For purposes of discussion, the home 1002(a) will be referred to as a near end of a communication session and the hub 102(a) will be referred to as the near-end hub 102(a). Similarly, the home 1002(b) will be referred to as a far end of a communication session and the hub 102(b) will be referred to as the far-end hub 102(b). The two display hubs 102(a) and 102(b) may be configured to communicate through a wide-area network 1004 such as the Internet. The hubs 102(a) and 102(b) may also be configured to communicate through or operate in conjunction with the network-based services 108.

In the example of FIG. 10, the two hubs 102(a) and 102(b) are configured to perform two-way video communications, allowing members of both households to see and hear each other. In this context, the term "video" may include audio, and it is understood that video conferencing or video communications may often include the bidirectional transmission of both video and audio between far-end and near-end sites. During a video conversation, near-end video and audio are captured by the near-end hub 102(a) and transmitted from the near-end hub 102(a) to the far-end hub 102(b). The far-end hub 102(b) receives and plays the near-end video and audio. Far-end video and audio are captured by the far-end hub 102(b) and transmitted from the far-end hub 102(b) to the near-end hub 102(a). The near-end hub 102(a) receives and plays the far-end video and audio.

The hubs 102 may be configured to automatically stage video conversations between pre-authorized households, such as households of parents and their grown children, as an example. More specifically each hub 102 may be pre-configured for automatic video conferencing with a limited number of other whitelisted hubs 102. For example, each display hub 102 may be configured for automatic video communications with 3-5 other hubs. The 3-5 other hubs may be located in households where family members desire spontaneous, frictionless, possibly day-to-day communications between households.

In order for automatically staged video communications to be enabled between two locations, each of the corresponding hubs 102 is configured to authorize or whitelist the other. In the example of FIG. 10, the near-end hub 102(a) has been configured to enable staged video communications with the far-end hub 102(b) and the far-end hub 102(b) has been configured to enable staged video communications with the near-end hub 102(a).

In some embodiments, each hub 102 may also be configured to have one or more time periods during which automatically staged video conferencing is enabled. For example, a first household may designate 7:00-8:00 AM and 8:00-9:00 PM as enabled communications periods. A second household may designate different periods, which may partially overlap or coincide with those of the first household. In embodiments such as these, automatically staged communications are enabled between two co-authorized hubs only during times that are within the enabled communications periods of both hubs.

When automatic staging of video conversations is initially enabled between two hubs, such as the near-end hub 102(a) and the far-end hub 102(b) of FIG. 10, a video conversation is pre-staged by each hub automatically sending an indication to the other hub and receiving an indication from the other hub. In certain implementations, this may comprise automatically sending obscured video to the other hub and displaying received obscured video from the other hub. In such implementations, obscured near-end video may be displayed on the far-end hub 102(b) without accompanying audio or with obscured audio. Likewise, obscured far-end video may be displayed on the near-end hub 102(a) without accompanying audio or with obscured audio. The video may be obscured, for example, by blurring the video to the extent that specific people and scene details are not discernable. As a more specific example, an optical filter or effect may be applied to the video giving the effect of looking through frosted glass, through which only vague shapes and gross movement can be discerned. Audio may be obscured by muffling or distorting the audio. The video and audio are obscured in order to provide privacy to each household while still allowing each household to be able to observe or notice general activity or motion in the other household.

A user at the near-end household 1002(a) may notice the provided and displayed notification or may notice movement or activity in the obscured far-end video, and may surmise that the users in the far-end household are potentially available for visiting or conversation. This may encourage the near-end user to initiate an unobscured video conversation with far-end users. The near-end user may initiate a video conversation by waving a hand, speaking, touching the displayed far-end image on the near-end hub 102(a), or by other means. This may cause the near-end video to be provided to the far end or to be clarified and/or unobscured at the far-end hub, and may also cause clear, unobscured near-end audio to be played at the far-end hub 102(b).

In some cases, only preauthorized users may be allowed to initiate unobscured video conversations. Furthermore, a video conversation may in some cases be automatically initiated upon identifying a near-end user and a far-end user who have indicated through previous configurations of their hubs that they wish to automatically initiate video conversations when they are both within range of their respective devices. User identities may be determined as already described above, by optical inspection and/or by analyzing characteristics of personal devices carried by the users.

Unobscuring the near-end video and audio allows the far-end users to see and hear near-end users by watching the near-end video on the far-end hub 102(b). A near-end user may say something to the far-end, such as "Hi Grandma, can you talk?" A far-end user may respond by requesting that the far-end video be unobscured at the near-end hub 102(a) and that far-end audio be provided as well at the near-end hub 102(a). This two-sided enablement results in fully two-way video and audio communications between near-end and far-end users, allowing spontaneous two-way video conversations when both sides of the conversation happen to be available. At each end of the conversation, a user may initiate the video conversation by speaking to the other side or by explicitly requesting the local display hub to initiate or allow the conversation. An explicit user command, for example, may comprise a gesture, a voice command, or a touch command.

Figure 11:
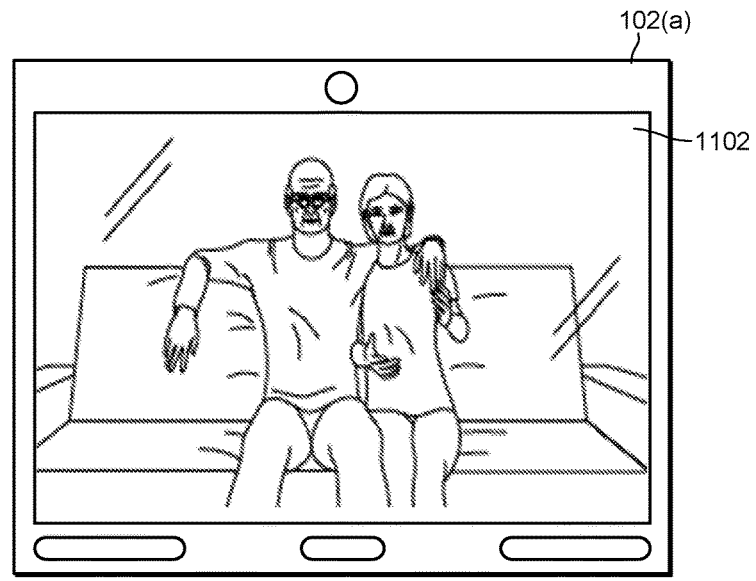
FIG. 11 is a front view of a display hub displaying unobscured content.
Figure 12:
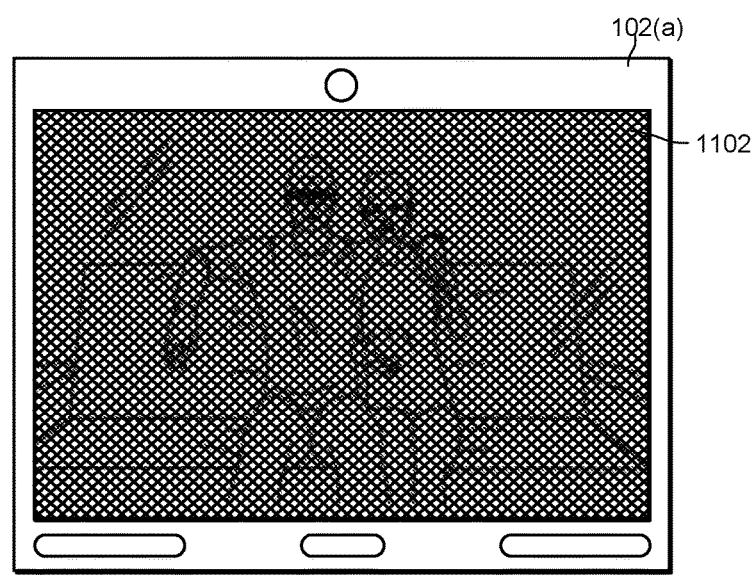
FIG. 12 is a front view of a display hub displaying obscured content.

FIGS. 11 and 12 show a diagrammatic example of obscuring video that is displayed on the near-end hub 102(*a*). FIG. 11 shows the near-end hub 102(*a*) as it displays unobscured far-end video 1102. FIG. 12 shows the near-end hub 102(*a*) displaying obscured far-end video 1102, wherein the obscuring is represented by cross-hatching. In actual implementation, more sophisticated filters or effects may be applied to video images to obscure details of the scene represented by the far-end video 1102. For example, images may be blurred using Gaussian blurring. Blurring may alternatively be accomplished by softening or defocusing. Obscuring may also be performed by decreasing pixel resolutions of video images and rendering the video at such reduced resolutions. As another example, video images may be blurred by darkening or shading the images. As yet another example, non-photorealistic rendering or animation effects may be applied to the video images. Non-photorealistic rendering effectively hides details of people and other objects by representing them as icons, computer-generated figures, or cartoon-like figures.

In some embodiments, a user may be allowed to configure the type or the amount of obscuring to be applied to images. Some users or households may be comfortable with a very low degree of obscuring, while others may want to obscure to hide all but a very low level of detail and movement. In some cases, different users of a single device may specify different types or amounts of obscuring for use when a video conversation is pre-staged between those users and another device.

Figure 13:
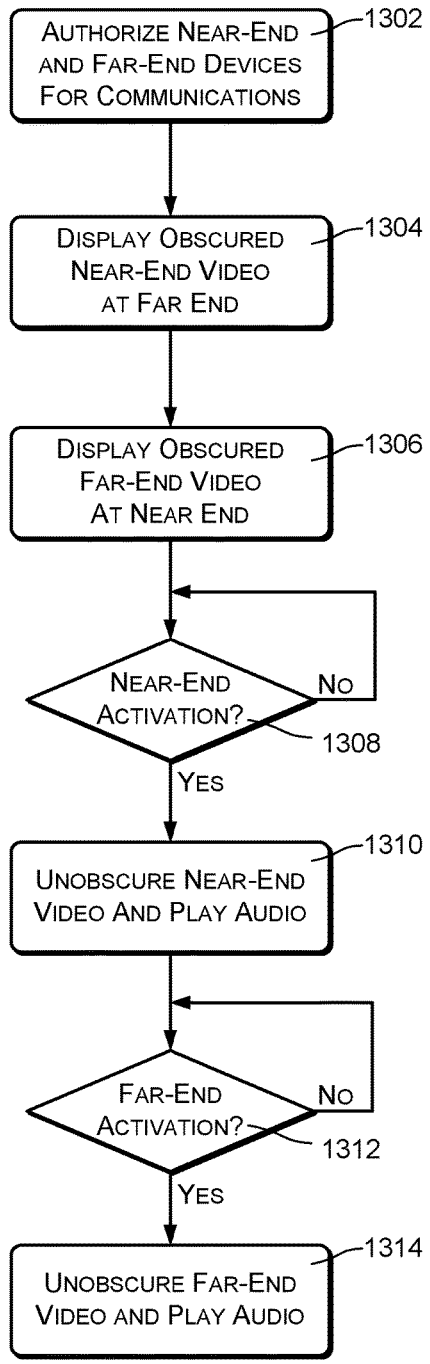

FIG. 13 shows an example method of enabling and implementing a video conversation between two households using display hubs such as described above or other devices.

An action 1302 comprises receiving designations from users of the display hubs indicating other display hubs that are authorized to receive audio and video and to participate in video conversations. This may comprise pre-authorizing a near-end device to perform automatically staged video conversations with the far-end device and pre-authorizing the far-end device to perform automatically staged video conversations with the near-end device. A user may provide authorization for one or more remote devices or users at each device during a setup or configuration process. Each device may be configured and authorized to perform automatically staged video conversations with several other devices. Far-end devices may be identified by user names, email addresses, phone numbers, addresses, or other information that is uniquely associated with each device.

An action 1304 comprises providing an indication or notice to an authorized far-end user that a near-end user is present in the vicinity of the near-end device. In certain embodiments, this may comprise pre-staging a video conversation by causing an obscured version of the near-end video to be transmitted to the far-end device and displaying the obscured near-end video at the far-end device, without audio. Alternatively, muffled or otherwise obscured audio may be played during the pre-staged video conversation. As yet another alternative, a graphical or audio notification may be provided at the far-end device to indicate that a user is present at the near-end device. For example, a chime may be played at the far-end device to indicate that a user is present at the near-end device. Presence of the near-end user may be detected by analyzing sensor data captured by the hub 102, such as camera images, depth sensors, motion sensors, etc. In some cases, the action 1304 may be performed in response to detecting and identifying a specific user in the vicinity of the near-end device, such as in response to performing facial recognition. Similarly, the action 1304 may be performed in response to detecting that any user or a particular user is gazing at the near-end device or otherwise directing his or her attention toward the near-end device.

An action 1306 comprises providing an indication or notice to the near-end user that a far-end user is present in the vicinity of the far-end device. In certain embodiments, this may comprise displaying obscured far-end video at the near-end device, without audio or with muffled or obscured audio. As another alternative, a graphical or audio notification may be provided at the near-end device to indicate that a user is present at the far-end device.

The presence notifications implemented at the near-end and far-end devices may differ depending on the identity of the person at each device. More specifically, a hub may be configured to associated different visual effects with different users. Before pre-staging a video conversation, a hub may perform face recognition to determine the identity of a nearby person and select a visual effect corresponding to that person. The selected visual effect may then be used curing video conversation pre-staging. For example, the presence of a first user may be indicated by a frosted glass effect that is tinted red, while the presence of a second user may be indicated by a frosted glass effect that is tinted blue. Various types of effects may be used for this type of user differentiation, including colored tints, patterns such as stained glass effects, edge effects, animation effects, and so forth.

An action 1308 comprises detecting a near-end activation of a video conversation. The action 1308 may comprise receiving or detecting a user action or command indicating that the near-end user wishes to allow a video conversation between the near-end device and the far-end device. The near-end user may issue an explicit command by waving their hand or performing some other pre-designated gesture. Alternatively, the near-end user may speak a command. As another alternative, the near-end user may touch the obscured display of the far-end video to initiate or allow a video conversation with the far-end device.

The action 1308 may alternatively comprise detecting a non-explicit user action indicating that the near-end user wishes to allow a video conversation. For example, the user may look directly at the display hub and speak, as if speaking directly to a person at the far-end device, and this action may be taken as an indication that the user wishes to initiate or allow a conversation. In some cases, the hub 102 may be configured to analyze a user utterance to determine whether it is likely to be directed to a far-end user. For example, a salutation or the mention of the name of a person at the far-end may be construed as a request to activate the video conversation. Natural language understanding (NLU) may be used to determine an intent to speak to a far-end user or to allow a video conversation.

The action 1308 is repeated until a near-end activation is detected.

Upon detecting a near-end user activation, an action 1310 is performed of unobscuring the near-end video, so that the near-end video is displayed without obscuring at the far-end device. Near-end audio may also be enabled or unobscured at the far-end device so that far-end users can both see and hear near-end users.

An action 1312 comprises detecting a far-end activation of the video conversation. The action 1312 may comprise receiving or detecting an explicit or non-explicit user action indicating that the far-end user wishes to allow the video conversation between the near-end device and the far-end device. The far-end user may issue an explicit command by waving their hand, performing another type of gesture, by speaking, by touching the display of the far-end device, etc.

The user may give a non-explicit activation by looking at the far-end display hub and speaking to a person shown on the far-end display hub. As mentioned above, the activation may be given by speaking a salutation, by speaking the name of someone at the far-end device, or by another phrase that can be analyzed as being directed to another person. Natural language understanding (NLU) may be used to determine an intent to speak to a near-end user or to allow a video conversation.

The action 1312 is repeated until a far-end activation is detected.

Upon detecting a far-end user activation, an action 1314 is performed of unobscuring the far-end video, so that the far-end video is displayed without obscuring at the near-end device. Far-end audio may also be enabled or unobscured at the near-end device so that near-end users can both see and hear far-end users.

In some embodiments, only the presence of preauthorized users may be used as the basis for pre-staging a video conversation and/or of initiating an unobscured video conversation. That is, obscured video may be displayed only when a preauthorized user is identified at each of the near and far ends, and an active video conversation may be initiated only by such a preauthorized user. The presence or identity of a user may be determined based on optical analysis and/or facial recognition of captured images or based on information obtained wirelessly from personal devices associated with individual users.

In certain embodiments, obscuring the near-end video and audio may be performed locally at the near-end device before transmitting the to the far-end device. Similarly, obscuring the far-end video and audio may be performed at the far-end device before transmitting to the near-end device. In some embodiments clear, unobscured video and audio may be transmitted to the network-based services 108 by both the near-end device and the far-end device, and the network-based services 108 may perform the blurring, muffling, obscuring, etc.

In some embodiments, the video pre-staging described with reference to FIG. 13 may be performed based on preconfigured communication periods at each device. That is, each device may be configured with one or more time periods during which video pre-staging is allowed, and pre-staging between two devices may be limited to those times that are within the configured communication periods of both devices.

FIGS. 14 and 15 show actions that are performed at a single one of the display hub devices in order to facilitate an automatically staged video conversation. The actions will be described as being performed by a near-end device, although either device may perform the described actions. The actions may be performed by both the device that initiates a video conversation and the device that responds or accepts the conversation.

An action 1402 comprise authorizing the near-end device to conduct automatically staged video conversations with a specified other device, such as the described far-end device, or with multiple other devices. Generally, a user may configure the near-end device to automatically stage video conversations with a limited number of other devices. A similar authorization is provided at the far-end device, authorizing the far-end device to automatically stage video conversations with the near-end device.

An action 1404 comprises receiving a designation of a near-end communications period for the near-end device and a far-end communications period for the far-end device. The near-end communication period may be received from a near-end user during a device configuration or setup. The far-end communication period may be received from the far-end device.

An action 1406 comprises determining a common communications period, based on the intersection between the near-end and far-end communications periods.

An action 1408 comprises determining whether the current time is within the common communications period, or whether the current time is within both a designated communications period of the near-end device and a designated communications period of the far-end device. The action 1408 is repeated until the current time is within a common communications period. Subsequent actions are performed during times that are within communications periods of both the near-end and far-end devices.

An action 1410 comprises capturing near-end video at the near-end device and providing the near-end video to the far-end device for display at the far-end device.

An action 1412 comprises receiving far-end video from the far-end device and displaying the far-end video at the near-end device. Both the near-end and far-end video are initially blurred or otherwise at least partially obscured. Audio is not initially rendered at either device. Alternatively, muffled or otherwise obscured audio may be exchanged and rendered by the devices. The actions 1408, 1410, and 1412 are repeated so that video and any accompanying audio are transmitted and received only during common communication periods.

FIG. 15 illustrates obscuring and unobscuring the near-end video and audio during the common communications period. An action 1502 comprises initially obscuring the near-end video or causing an obscured version of the near-end video to be transmitted to the far-end device. The obscuring may be performed by the near-end device or by the far-end device. An action 1504 comprises determining whether an indication from a near-end user has been received indicating the near-end user's consent to allow a near-end video to be transmitted to the far-end device. The action 1504 is repeated until such an indication has been received.

The action 1504 may in some cases include the use of natural language understanding to detect an intent expressed by an utterance of a near-end to converse with the far-end user. For example, the user may state "Hi Joe," which may be analyzed as indicating an intent to converse with the far-end user.

Upon receiving an indication from a near-end user to allow a video conversation, the near-end device performs an action 1506 of providing an unobscured version of the near-end video be transmitted to the far-end device, either by stopping the obscuring process or by instructing the far-end device to stop the obscuring.

An action 1508 comprises determining whether an indication from the near-end user has been received indicating an intent to stop or end the video conversation. The action 1508 is repeated until such an indication has been received, and the near-end video therefore continues to be unobscured. Upon receiving an indication of an intent to stop or end the video conversation, the process returns to the action 1502 and the video is again obscured. The action 1508 may alternatively comprise determining whether a time-out has occurred. A time-out may occur when all users leave the vicinity of one of the devices for a given time period or when no activity or conversation occurs within a given time period.

Figure 16:
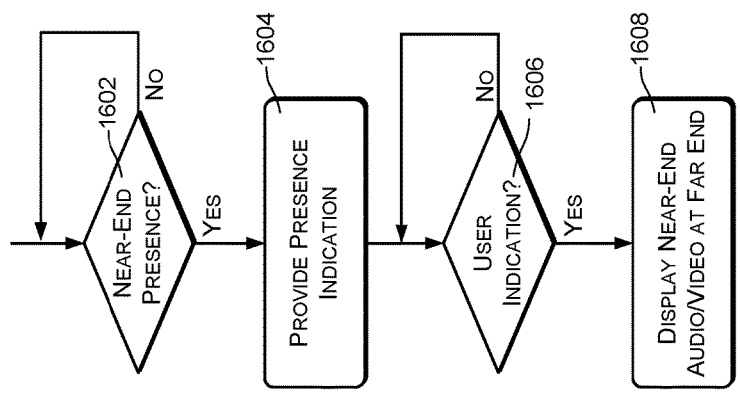

FIG. 16 illustrates another example method of determining whether and when to exchange audio and video between near-end and far-end devices. The illustrated method 1500 may be performed in conjunction with the actions of FIG. 13, as an alternative to the actions of FIG. 15.

An action 1602 comprises analyzing near-end video to determine whether a near-end user is present at or near the near-end device. If a user is not present, the action 1602 is repeated until detecting a user. Subsequent actions are performed upon detecting near-end user presence. The action 1602 may be performed by face detection, skeletal detection, motion sensing, and/or other means.

An action 1604 comprises providing an indication of the user presence at or to the far-end device. The action 1604 may comprise providing a notification to the far-end device, which may respond by playing a sound or displaying a graphic indicating that a user is present at the near-end device.

An action 1606 comprises determining whether an indication from a near-end user has been received indicating the near-end user's consent to allow a video conversation between the near-end and far-end devices. The action 1606 is repeated until such an indication has been received.

Upon receiving an indication from a near-end user to allow a video conversation, the near-end device performs an action 1608 of causing the near-end video and audio to be provided to and rendered by the far-end device.

Although certain distributions of functionality and responsibility are described in the above examples, such functionality and responsibility may be distributed in different ways. Generally, the functions and actions described above may be distributed in different ways between the near-end device, the far-end device, the network-based services, and/or other entities, devices, and functional components. In addition, the techniques described above may be used in environments other than the environment shown herein.

Figure 17:
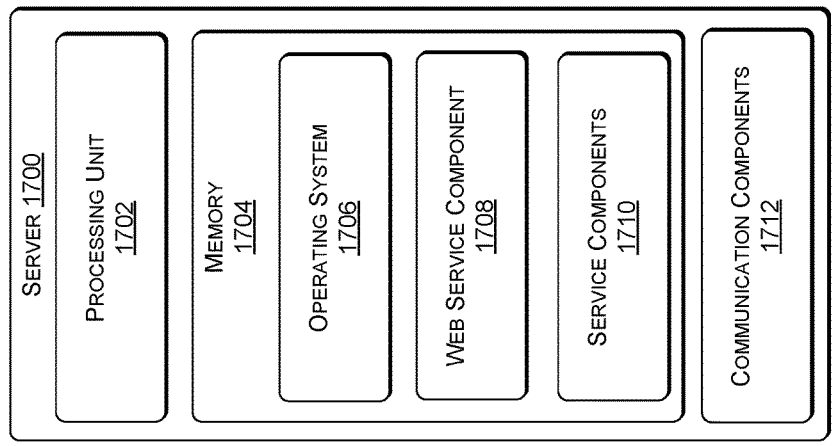
FIG. 17 is a block diagram illustrating an example configuration of a server that may be used for implementing network-based services in conjunction with one or more display hubs.

FIG. 17 illustrates relevant components of a server 1700 that may be used to implement the network-based services 108. The network-based services 108 may be implemented by one or more servers or server instances, with the various functionality described above distributed in various ways across the different servers. Servers may be located together or separately, and organized as virtual servers, server banks, and/or server farms. The described functionality may be provided by the servers of a single entity or enterprise, or may utilize the servers and/or services of multiple entities or enterprises.

In a very basic configuration, the example server 1700 may comprise a processing unit 1702 having one of one or more processors and associated memory 1704. The memory 1704 may comprise computer storage media and may include volatile and nonvolatile memory. Thus, the memory 1704 may include, but is not limited to, RAM, ROM, EEPROM, flash memory, or other memory technology, or any other medium which can be used to store data.

The memory 1704 may be used to store any number of functional components that are executable on the processing unit 1702. As examples, the memory 1704 may store an operating system 1706 and a web services component 1708 for communicating with client devices such as display hubs 102.

The memory 1704 may also contain service components such as speech and language processing components, video processing components, and so forth as may be appropriate for performing the actions described above.

The server 1700 may also include communications components 1712 for network communications with other network entities, including clients such as the display hub 102 as well as other servers.

The server 1700 may of course include many other logical, programmatic, and physical components, of which those shown in FIG. 17 are merely examples that are related to the discussion herein.

Although the subject matter has been described in language specific to structural features, it is to be understood that the subject matter defined in the appended claims is not necessarily limited to the specific features described. Rather, the specific features are disclosed as illustrative forms of implementing the claims.

The invention claimed is:

1. A device comprising:
a display;
a camera;
memory storing computer executable instructions; and
at least one processor configured to access the memory and execute the computer-executable instructions to perform actions comprising:
capturing image data corresponding to an environment;
detecting a presence of a user in the environment based at least in part on the image data;
detecting a device identifier of a user device present in the environment;
determining a user account associated with the device identifier;
determining content density based at least in part on settings associated with the user account; and
displaying visual content using the content density.

2. The device of claim 1, wherein the image data includes a depth map of the environment, and wherein detecting the presence of the user further comprises detecting the presence of the user based at least in part on the depth map.

3. The device of claim 1, wherein determining the content density further comprises determining the content density based at least in part on visual acuity information associated with the user account.

4. The device of claim 1, further comprising:
processing the image data using a facial recognition algorithm; and
determining the user is associated with the user account based at least in part on output of the facial recognition algorithm.

5. The device of claim 1, further comprising:
sending a request for device information to the user device via a wireless connection; and
determining the device identifier using the device information.

6. The device of claim 1, further comprising receiving location information from the user device, wherein detecting the presence of the user in the environment is further based at least in part on the location information.

7. The device of claim 1, wherein the user is a first user, wherein the user account is a first user account, wherein the content density is a first content density, wherein the visual content is a first visual content, and wherein the actions further comprise:
determining that a gaze of a second user is directed toward the display;
determining the second user is a primary user with respect to the first user based at least in part on the determining that the gaze of the second user is directed toward the display;

determining a second content density based at least in part on settings associated with a second user account; and displaying second visual content at the display using the second content density.

8. The device of claim 7, wherein determining the second user is the primary user further comprises:
   determining a first distance between the first user and the device;
   determining a second distance between the second user and the device; and
   determining that the second distance is less than the first distance.

9. A method comprising:
   capturing, by one or more processors of a device, image data corresponding to an environment;
   detecting, by the one or more processors, a presence of a user in the environment based at least in part on the image data;
   detecting, by the one or more processors, a device identifier of a user device present in the environment;
   determining, by the one or more processors, a user account associated with the device identifier;
   determining, by the one or more processors, content density based at least in part on settings associated with the user account; and
   displaying, by the one or more processors, visual content using the content density.

10. The method of claim 9, wherein the image data includes a depth map of the environment, and wherein detecting the presence of the user further comprises detecting the presence of the user based at least in part on the depth map.

11. The method of claim 9, wherein determining the content density further comprises determining the content density based at least in part on visual acuity information associated with the user account.

12. The method of claim 9, further comprising:
    processing the image data using a facial recognition algorithm; and
    determining the user is associated with the user account based at least in part on output of the facial recognition algorithm.

13. The device of claim 9, further comprising:
    sending a request for device information to the user device via a wireless connection; and
    determining the device identifier using the device information.

14. The method of claim 9, further comprising receiving location information from the user device, wherein detecting the presence of the user in the environment is further based at least in part on the location information.

15. The method of claim 9, wherein the user is a first user, wherein the user account is a first user account, wherein the content density is a first content density, wherein the visual content is a first visual content, and wherein the method further comprises:
    determining that a gaze of a second user is directed toward the display;
    determining the second user is a primary user with respect to the first user based at least in part on the determining that the gaze of the second user is directed toward the display;
    determining a second content density based at least in part on settings associated with a second user account; and
    displaying second visual content at the display using the second content density.

16. A device comprising:
    a display;
    one or more sensors;
    memory storing computer executable instructions; and
    at least one processor configured to access the memory and execute the computer-executable instructions to perform actions comprising:
      capturing, using the one or more sensors, speech data associated with an environment;
      detecting presence of a user in the environment based at least in part on the speech data;
      determining, using the speech data, a user account associated with the user;
      determining content density based at least in part on the settings associated with the user account; and
      displaying visual content using the content density.

17. The device of claim 16, wherein the one or more sensors include one or more of: a microphone, a camera, a proximity sensor, a motion sensor, or a depth sensor.

18. The device of claim 16, wherein determining the user account associated with the user comprises determining the user account associated with the user based at least in part on sending the speech data to a network-based services device and determining information indicative of the user account from the network-based services device.

19. The device of claim 16, further comprising capturing image data associated with the environment, wherein the image data includes a depth map of the environment, and wherein the actions further comprising determining a distance of the user to the device.

20. The device of claim 17, wherein the actions further comprise adjusting the content density based at least in part on a detected change to the distance of the user to the device.

* * * * *